United States Patent [19]
Woten

[11] Patent Number: 4,465,239
[45] Date of Patent: * Aug. 14, 1984

[54] FEEDER ASSEMBLY FOR INSULATION BLOWING MACHINES

[76] Inventor: Homer G. Woten, 912 Perrin Ave., NW., Winter Haven, Fla. 33880

[*] Notice: The portion of the term of this patent subsequent to Oct. 25, 2000 has been disclaimed.

[21] Appl. No.: 426,160

[22] Filed: Sep. 28, 1982

Related U.S. Application Data

[63] Continuation-in-part of Ser. No. 251,710, Apr. 6, 1981, Pat. No. 4,411,390.

[51] Int. Cl.³ .............................................. B02C 17/16
[52] U.S. Cl. .................. 241/98; 241/101 A; 241/159; 406/64
[58] Field of Search ............... 241/152 A, 159, 101 A, 241/200, 235, 98; 406/64, 65

[56] References Cited

U.S. PATENT DOCUMENTS

| | | | |
|---|---|---|---|
| 810,989 | 1/1906 | Steinert . | |
| 2,180,379 | 11/1939 | Whitfield | 302/35 |
| 2,684,206 | 7/1954 | Zettel | 241/84 |
| 3,085,834 | 4/1963 | Woten et al. | 302/49 |
| 3,135,561 | 6/1964 | Kempthorne | 302/49 |
| 3,346,197 | 10/1967 | Sagar | 241/23 |
| 3,529,870 | 9/1970 | Woten | 302/49 |
| 3,552,800 | 1/1971 | Truetzschler | 302/40 |
| 3,724,908 | 4/1973 | Burrough et al. | 302/37 |
| 4,111,493 | 9/1978 | Sperber | 302/42 |

FOREIGN PATENT DOCUMENTS 144532 1/1931 Switzerland .

Primary Examiner—Howard N. Goldberg
Assistant Examiner—Timothy V. Eley
Attorney, Agent, or Firm—Lalos, Leeds, Keegan, Lett, Marsh, Bentzen & Kaye

[57] ABSTRACT

A feeder assembly for particulate matter blowing machines including a cylindrical member with an opening along its upper surface through which particulate matter is inserted. A drive shaft is positioned longitudinally through the member and a cylindrical drum mounted around the drive shaft. A vane assembly attached to the drum engages the inner surface of the member at a plurality of locations thereby defining a plurality of airlocks. An inlet cover is attached to one end of the member and it has an inlet opening through which gases are forced into the airlocks. An outlet cover is attached to the opposite end of the cylindrical member and the outlet cover has an outlet opening aligned with the inlet opening through which the particulate matter is blown out of the airlocks. A motor turns the drive shaft whereby the airlocks pass adjacent the opening and particulate matter fills the airlocks, and then the airlocks are rotated until adjacent the openings when the material is blown out.

34 Claims, 7 Drawing Figures

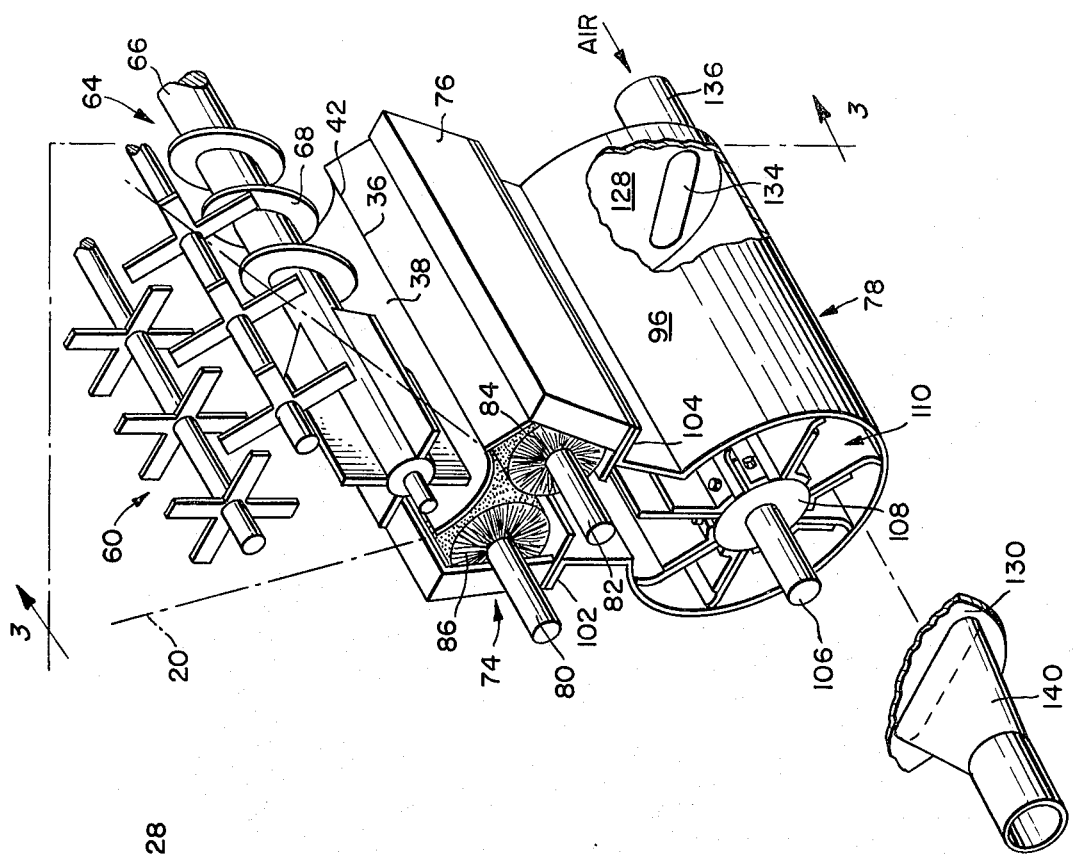
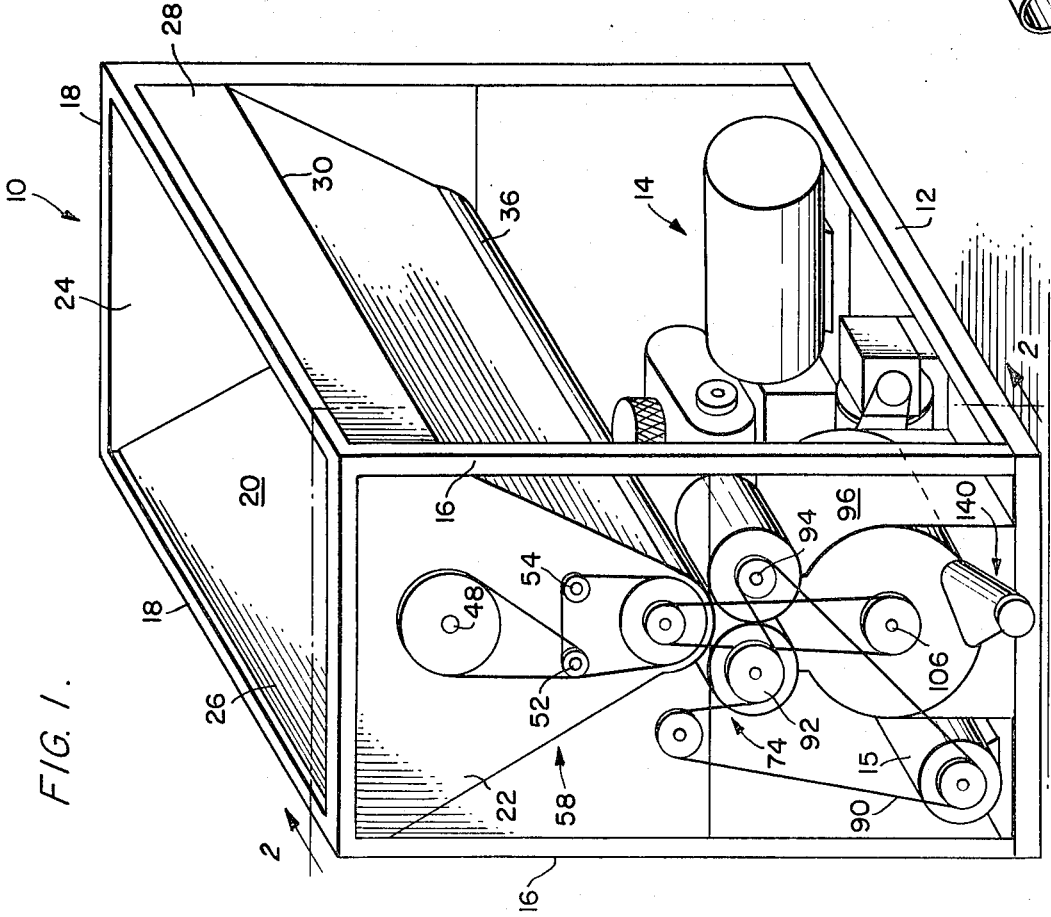

FEEDER ASSEMBLY FOR INSULATION BLOWING MACHINES

This is a continuation-in-part of application Ser. No. 251,710, filed Apr. 6, 1981 now U.S. Pat. No. 4,411,390.

BACKGROUND OF THE INVENTION

This invention relates to an apparatus for producing particulate material from compact masses of material. More particularly the present invention is concerned with an apparatus for producing particulate material from compressed or compacted masses of material such as insulation materials and then pneumatically blowing or spraying such materials. This invention further relates to an improved feeder assembly for such an apparatus which pneumatically blows such materials to the desired location.

In general the types of insulation materials with which the present invention is concerned include loose insulating material that is generally, but not exclusively, fibrous such as granulated rock wool, granulated mineral fiber wool, glass fiber materials, cellulose fibers, expanded mica, etc. This insulation material may be in particulate form and may be either blown dry or sprayed through a nozzle with liquid added to form an insulating and sealing coating on any surface. The insulation material has been blown on conven-tional ceilings of places of habitation or working areas as well as in mine shafts, tunnels and the like.

The insulating material used in conventional insulation spraying and blowing machines is in a relatively loose condition but it is usually packed under high compression in bags or sacks for shipment to the user. Upon being opened these bags or sacks usually yield compressed masses of the insulation material that render the insulation material difficult to use in conventional apparatus that require feeding through an air hose to the area to be insulated. Because of the very low density of the material there is usually formed under the compaction in the bags or sacks large masses that are perhaps up to a foot or more in diameter and cannot be easily separated into the individual particulate material. Even smaller masses in the form of nodules that may be up to several inches in diameter are unsuitably large to be fed through an air hose or to be effective in providing the desired insulation. These large masses as well as the nodules must be separated into particulate materials, although they may be to some extent intertwined with each other and not be discrete. The fibrous material forming the majority of the insulating materials is typically the most difficult to handle unless it is kept in a semi-fluidized state which desirably relies upon the material being particulate. The term "particulate" includes not only particles but also one or more intertwined or overlapping fibers and for convenience the term "particulate material" will therefore include materials formed as particles as well as such fibers.

The parent application over which this invention is an improvement discloses an apparatus for producing preselected and consistent density of particulate material from compact masses of insulation materials and then pneumatically dispensing the material in a uniform flow. The apparatus includes a hopper for receiving the compact masses, an outlet positioned in the bottom of the hopper and a shredding zone located within the upper portion of the hopper for shredding large compact masses into smaller masses or nodules. A shredding means including a plurality of counterrotating shafts and having a plurality of radially extending bars extend through the hopper and have orbits that mutually overlap. An auger is positioned below the shredding means and above the outlet for moving the material along the hopper. Below the auger is a tearing and separating zone that receives the material from the outlet and operates to tear and separate any of the nodules of the material into particulate material. The tearing and separating zone includes means having a plurality of counterrotating brush elements through which the material passes to be torn and separated. The particulate material is then received and dispensed by a pneumatic trans-port means, which includes a rotating air lock having an inlet at one end and an end plate at the other or exhaust end of the air lock. An exhaust metering port is formed in the end plate with a graduated opening enlarged towards the direction of rotation of the air lock to permit the particulate material to be progressively discharged.

The particulate matter was not, however, being completely discharged in the above-described apparatus. In particular, the material was getting stuck in the narrow part of the discharge airlock and around the bolts holding the sealing strips to the long support members. Also, insufficient pressure was being developed in the airlock cells to blow or spray the materials resulting in inconsistent and incomplete filling and dumping of the airlock chambers.

It was also found that to replace the rubber seals as they wore out required that the rotor be removed from the feeder barrel. This meant that more skilled repair personnel were needed and that the machine would be out of use for longer periods of time.

OBJECTS OF THE INVENTION

The principal object of the present invention is to provide for an improved apparatus for producing particulate material from compact masses of such material and pneumatically conveying and dispensing such materials.

Another object of the present invention is to provide for an improved assembly for blowing or spraying particulate material.

A further object of the present invention is to provide for an improved apparatus for blowing or spraying particulate material which more completely sprays the material out of the chambers.

A still further object of the present invention is to provide for an improved apparatus for blowing or spraying particulate material which has an easier, smoother, and more consistent filling and dumping of the airlock chambers.

Another object is to provide for a particulate material blowing assembly having more sealing surface on its vanes and thus having greater pressure to blow the materials to the desired location.

A further object is to provide for a smoother flow of the particulate material with less pulsations.

A still further object is to provide for a more thorough discharge from each of the chambers as it passes the air stream.

Another object is to provide for a particulate blowing assembly including sealing strips which are easy to replace when worn.

A further object is to provide for an apparatus which does not require that the rotor be removed from the feeder barrel when the sealing strips are being replaced.

Other objects and advantages of the present invention will become more apparent to those persons having ordinary skill in the art to which the present invention pertains from the following description taken in conjunction with the accompanying drawings.

THE DRAWINGS

FIG. 1 is a perspective view of an apparatus for producing particulate material from compact masses of material illustrating generally the concepts of the present invention.

FIG. 2 is a partially broken away cross-sectional view taken generally along line 2—2 of FIG. 1 illustrating the internal components of the present invention.

DESCRIPTION OF THE PREFERRED EMBODIMENT

Figure 3:
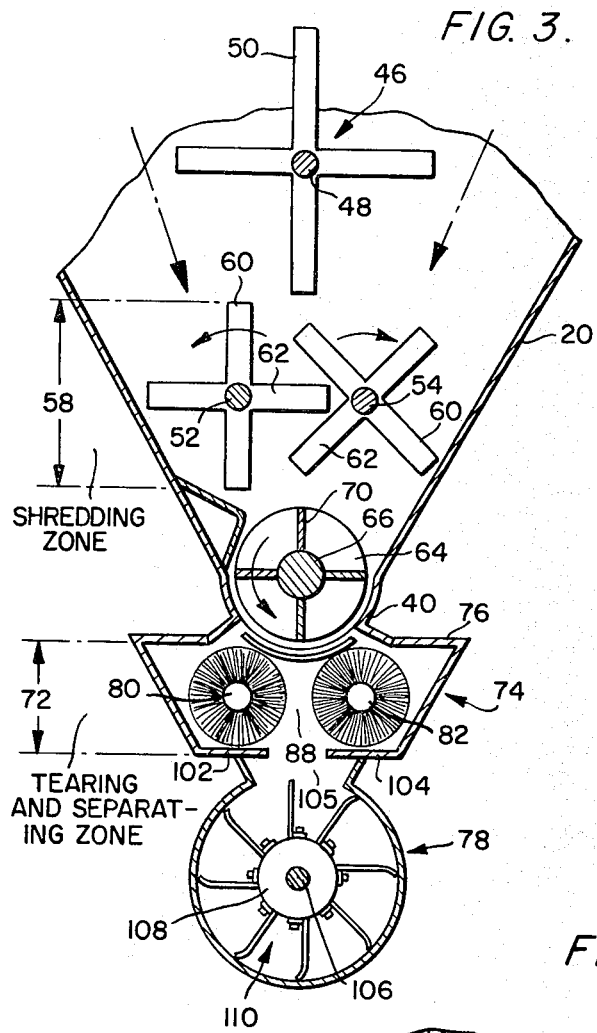
FIG. 3 is a sectional view taken along line 3—3 of FIG. 2.

As may be best seen in FIG. 1 the present invention, shown generally at 10, is the complete apparatus for producing particulate material from compact masses and uniform and preselected density. As shown, the apparatus may be sized for different purposes but generally it is to be expected that the apparatus will be mobile and permit transportation to various job locations where insulation is to be applied.

The apparatus includes a base 12 to support the drive mechanisms 14 and 15 securely attached to base 12. Upright frame members 16 are positioned to rise from the corners of the base 12 and along with cross members 18 provide support for the hopper 20. Hopper 20 is provided with vertical end walls 22 and 24 that depend from the cross members 18. The hopper is provided with downwardly extending side walls 26 and 28 secured to the cross members 18. Side wall 28 only extends part way down the hopper to a point at 30 where it converges to form lower inclined wall 32. At the bottom of the hopper 20 is arcuate trough 36 formed from side wall 26 and lower wall 32. The trough extends the length of the hopper and forms a bottom 38.

The arcuate trough 36 is cut away at one end of the hopper to form a material outlet 40. The outlet is of preselected length and width and sufficiently large to accommodate the highest volume flow of material that would be desired. The outlet 40 is made adjustable however to control the flow rate of the material through the outlet by means of a sliding gate. To permit ease of adjustability, and to indicate the position of the sliding gate, a manual indicator and adjustor is provided for use by the operator. It is then a simple matter to move the adjustor longitudinally of the trough to open or close the outlet 40.

As best shown in FIGS. 2 and 3, the contents of the hopper 20 are kept in motion by means of an agitator shown generally at 46 which is positioned high in the hopper and extends longitudinally to rotate about shaft 48. The agitator is provided with a plurality of rods 50 secured to the shaft 48 in any suitable manner. The rods are positioned to be in pairs at right angles to each other as best shown in FIG. 3. The pairs of rods 50 are spaced along the shaft in any convenient interval.

Positioned below the agitator 46 and mounted on shafts 52 and 54, which are preferably counterrotating, is a shredding means 56 positioned within the shredding zone 58 as illustrated by the vertical line between the arrows. This initial shredding is important to achieve the uniformity in density that is produced by the present invention. Each of the counter-rotating shafts 52 and 54 is provided with pairs of bars 60 and 62. The bars 60 and 62 are suitably secured to their respective shafts 52 and 54. The shredding bars 60 and 62 are coupled in pairs and spaced at various intervals along the respective shafts 52 and 54 as best shown in FIG. 2. It is seen in FIG. 3, that the shafts 52 and 54 are closely adjacent such that the orbit of the shredding bars 60 and 62 substantially overlap. While there is no actual physical contact between the shredding bars on one shaft with the shredding bars on the other shaft, it can be seen that the orbits of the shredding bars on the adjacent shafts substantially overlap and intermesh.

Positioned immediately below the shredding bars 60 and 62 to receive the material passing through the shredding zone is a conveying means of any type such as an auger 64 mounted for rotation within the trough 36. The auger is provided with a shaft 66 extending through the end walls 22 and 24 of the hopper. The auger screw 68 extends along the auger shaft 66 from the end wall 24 up to approximately the beginning of the outlet 40 as best shown in FIG. 2. From that point through the full longitudinal extent of the outlet 40 the auger shaft 66 is provided with radial paddles 70. The direction of rotation of the auger shaft and the auger screw spiral are constructed such that material dropping from the shredding zone into the auger and falling to the bottom of the hopper will be moved towards the outlet 40. The radial paddles 70 positioned at right angles to adjacent paddles help to move the material through the outlet 40.

As the material falls through outlet 40 it enters a tearing and separating zone shown generally at 72 in which are included the tearing and separating means 74. The tearing and separating means 74 is retained in the brush housing 76 which bridges the outlet 40 and is connected to the drum feeder shown generally at 78 positioned below. Within brush housing 76 and mounted for rotation are a pair of shafts 80 and 82 that preferably counterrotate. Secured to each of the shafts 80 and 82 are wire brushes 84 and 86. It is preferred that the brushes 84 and 86 extend the full length of the shafts 80 and 82 and rotate freely within brush housing 76. It is also preferable that the orbit of the brushes on the adjacent shafts 80 and 82 be such that the spacing 88 between the brushes be relatively small, preferably less than a quarter of an inch. The shafts 80 and 82 may be rotated at different speeds such as by endless belt 90 which wraps around ordinary but different sized pulleys 92 and 94. Due to the different rotational speeds of the brushes 84 and 86 material passing through the spacing 88 is torn apart. This is particularly evident in the event that nodules of insulating material drop from the outlet into the tearing and separating zone and it is here that the tips of the brushes tear away the individual fibers leaving the particulate material to pass through the tearing and separating zone into drum feeder 78. The density of the product entering the air lock is thus made more uniform.

Drum feeder 78 includes a feeder barrel 96 having opposing support legs 98 and 100 and horizontal plates 102 and 104 on which brush housing 76 is mounted. A lengthwise opening 105 along its upper surface allows the material to pass from spacing 88 of the tearing and separating zone into drum feeder. WDdrive shaft 106 is positioned in feeder barrel 96 along its longitudinal axis. Cylindrical drum rotor 108 is attached to drive shaft 106 and extends generally the length of feeder barrel 96. A plurality of vanes shown generally at 110 are attached to rotor 108 by metal brackets 112. Brackets 112 include a first leg 114 positioned against rotor 108 and secured thereto by screws 116 and a second leg 118 extending generally radially from rotor 108. Pliable seal strips 120 are attached by glue or similar adhesive means to second legs 118. The strips engage the inner surface of the barrel thereby defining a plurality of cavities, including cavities 122, 124 and 126. As can be readily seen from the drawings, the cavities define a more rectangular shape than the previous triangular shape. The omitted small pie-shaped portion in prior machines frequently did not discharge completely as it passed the air stream. This problem does not exist according to the present invention and the result is a smoother flow of material with fewer pulsations.

The present design including drum rotor 108 provides a greater surface to which the vanes may be attached. Thus, a greater number of vanes (for example, eight are illustrated in the drawings) can be used. The greater number of vanes used means the greater number of cavities defined thereby and thus, the greater pressure that may be thereby generated. It has further been found that the rubber seals wear out and must frequently be removed and replaced. The design according to the present invention permits the seals to be more readily changed without removing the rotor from the feeder barrel.

Figure 5:
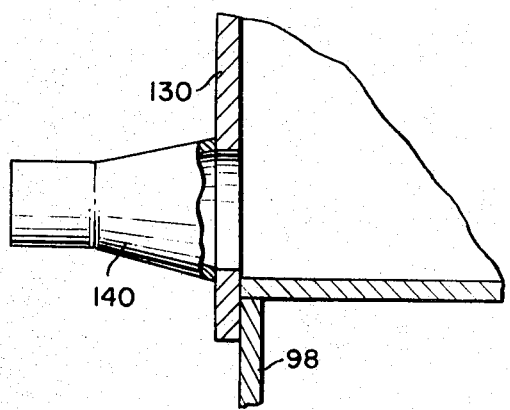
FIG. 5 is a sectional view taken along line 5—5 of FIG. 4.
Figure 4:
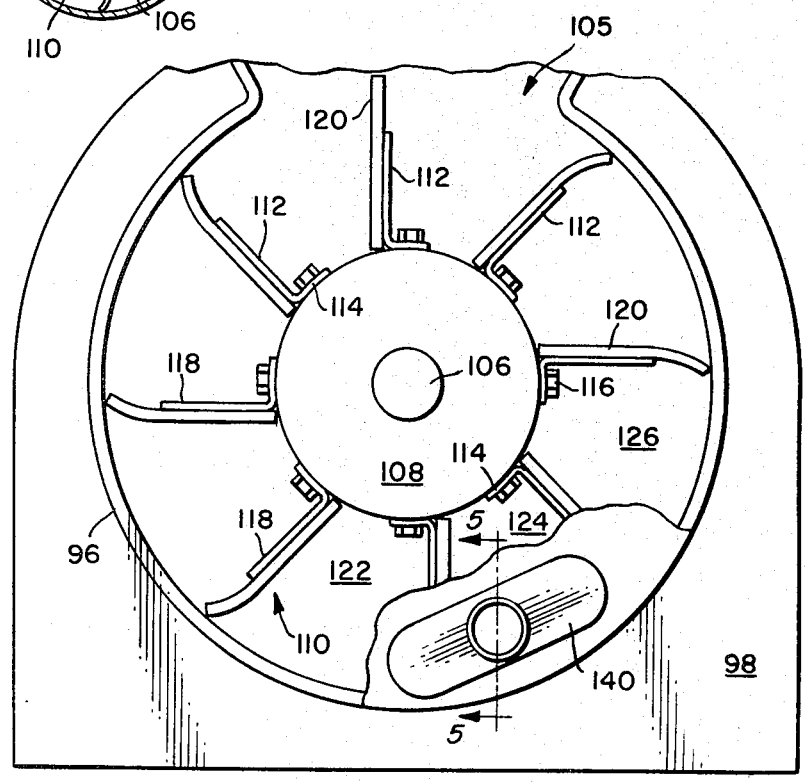
FIG. 4 is an enlarged end elevation view, partially broken away, of the air lock feeder and the exhaust metering port.
Figure 6:
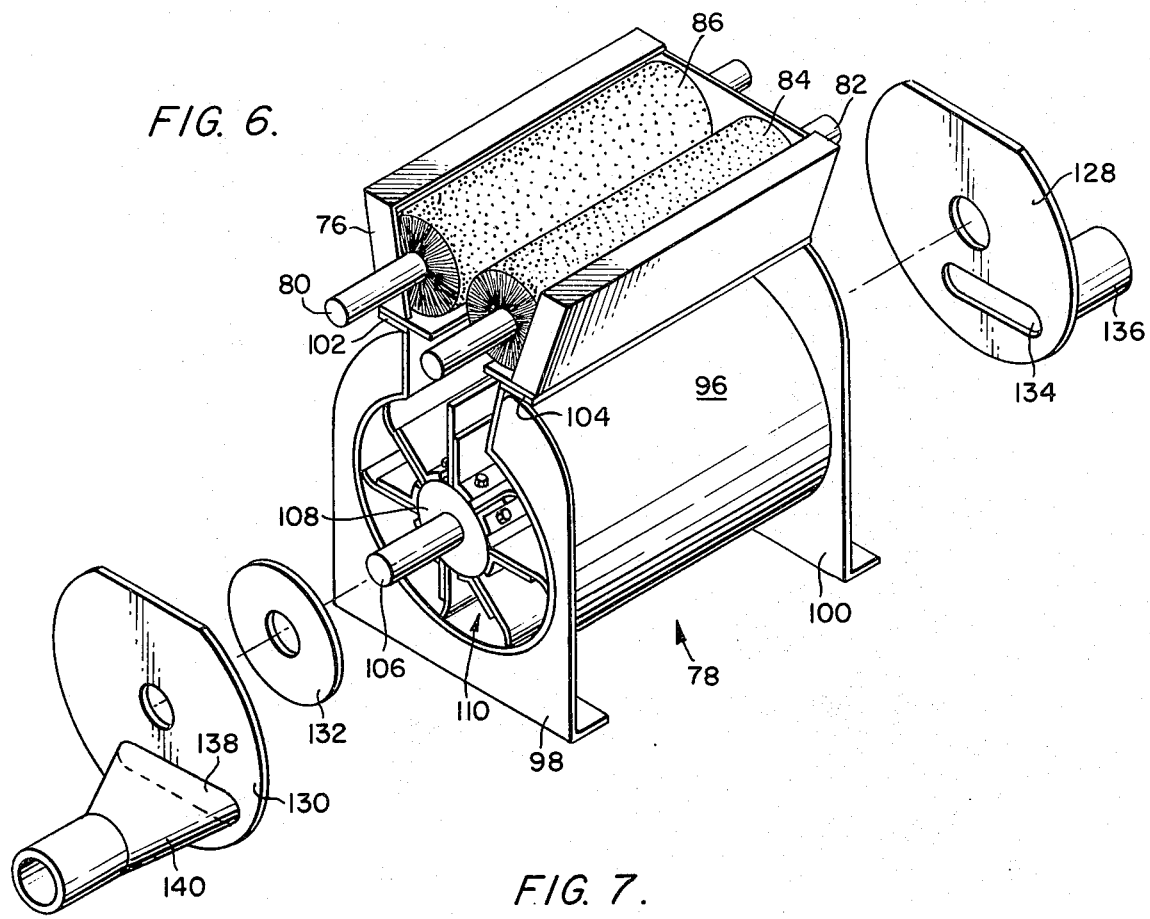
FIG. 6 is a partially-exploded perspective view of the air lock feeder and rotating brushes of the apparatus of FIG. 1.
Figure 7:
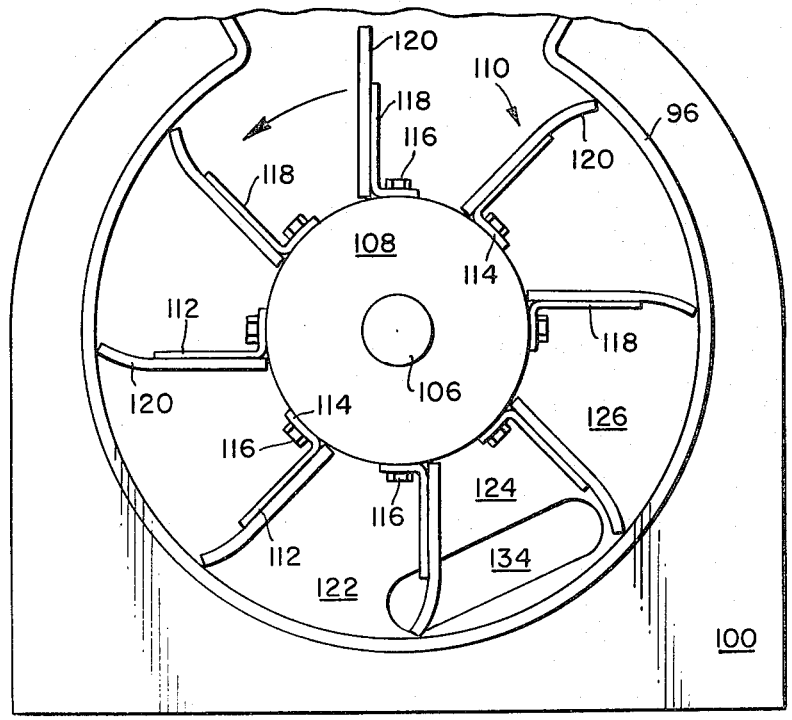
FIG. 7 is an enlarged, elevation view of the air lock feeder of FIG. 6.

Inlet plate 128 as best shown in FIG. 6, is attached to one end of the barrel and a fiber seal placed therebetween. A corresponding outlet plate 130 is attached to the opposing end and a fiber seal 132 placed therebetween. An oblong shaped air inlet 134 is positioned in inlet plate 128, offset in the direction of rotation of the vanes and disposed at an angle to the horizontal as best shown in FIG. 7. A suitable inlet hood 136 is attached to the inlet cover about air inlet 134. Air outlet 138 in outlet plate 130, although disposed generally parallel to inlet 134, can have a tapered, material-metering shape as best described in the parent application. This parallel alignment of the holes provides a feeder which delivers the particulate material faster than that of prior machines. Outlet hood 140, as shown in FIG. 5, is attached to outlet plate 130 and houses the air outlet. Thus, when the filled cavities are aligned with the holes the air stream blows or sprays the particulate matter out in a rapid, even spray.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. An apparatus for producing particulate material from compact masses of material such as insulation materials and pneumatically dispensing such materials comprising,
   a hopper for containing said compact masses,
   an outlet positioned towards the bottom of said hopper,
   a shredding zone located within an upper portion of said hopper for receiving said materials and shredding any large compact masses of said material into smaller masses or nodules,
   a shredding means positioned in said shredding zone and including a plurality of rotating elements for receiving and shredding said compact masses,
   a conveying means positioned below said shredding means and above said outlet for moving said material along said hopper,
   a tearing and separating zone positioned below said outlet and receiving said material passing through said outlet to tear and separate any nodules of said material into particulate material,
   said tearing and separating zone including a plurality of rotating brush elements through which said material passes to be torn and separated, and
   a pneumatic transport means positioned below said tearing and separating zone to receive and dispense said particulate material,
   said pneumatic transport means including a housing, a drive shaft positioned in said housing, a drum mounted around said drive shaft, said drum having a larger diameter than said drive shaft, and a vane means attached to said drum.

2. The apparatus according to claim 1 including,
   said housing including a cylindrical member having an opening on its upper surface positioned beneath said rotating brush elements, said drive shaft being disposed in said cylindrical member, an inlet cover having an inlet opening and attached to one end of said cylindrical member, and an outlet cover having an outlet opening and attached to the end of said cylindrical member opposite said one end.

3. The apparatus according to claim 2 including,
   said inlet opening being offset in the direction of rotation of said drive shaft from a vertical line passing through the center of said drive shaft, and said outlet opening being generally aligned with said inlet opening.

4. The apparatus according to claim 3 including,
   said outlet opening being progressively larger at the trailing edge in the direction of rotation and tapered to close at the leading edge.

5. The apparatus according to claim 2 including, said vane means comprising a plurality of elongated brackets,
   each said bracket having a first leg positioned along said drum, a sealing strip secured to said frist leg, a securing means for securing said strip to said first leg, a second leg attached to said first leg and extending generally radially from said drum, and an attaching means for attaching said first leg to said drum.

6. The apparatus according to claim 5 including, said securing means comprising an adhesive means.

7. The apparatus according to claim 5 including, said attaching means comprising a removable attaching means.

8. The apparatus according to claim 5 including, said strips defining a seal with said cylindrical member.

9. The apparatus according to claim 5 including,
said inlet opening being offset in the direction of rotation of said drive shaft from a vertical line passing through the center of said drive shaft,
said outlet opening being generally aligned with said inlet opening,
said inlet opening and said outlet opening being disposed at an angle to the horizontal, and
said inlet opening and said outlet opening being longer than the distance between two adjacent said first legs at the location next to said openings.

10. The apparatus according to claim 1 including,
said vane means comprising a plurality of elongated brackets, each said bracket having a first leg positioned along said drum, a sealing strip secured to said first leg, a securing means for securing said strip to said first leg, a second leg attached to said first leg and extending generally radially from said drum, and an attaching means for attaching said first leg to said drum.

11. The apparatus according to claim 10 including, said securing means comprising an adhesive means.

12. The apparatus according to claim 10 including, said attaching means comprising a removable attaching means.

13. The apparatus according to claim 10 including, said strips defining a seal with said housing.

14. The apparatus to claims 1, 2, 10 or 5 including,
said shredding means and said plurality of rotating elements including a plurality of counterrotating shafts extending through said hopper, each said shaft being provided with a plurality of radially extending bars.

15. The apparatus according to claim 14 including,
said shafts being sufficiently proximate to permit the orbit of said bars to overlap so as to separate said masses of compact material passing through said bars.

16. The apparatus according to claim 14 including,
said plurality of rotating brush elements being provided on adjacent counterrotating shafts wherein said brush elements extend radially and confront brush elements on an adjacent shaft.

17. The apparatus according to claim 16 further comprising,

18. The apparatus according to claim 14 including,
said shredding means and said plurality of rotating elements including a plurality of counterrotating shafts with a plurality of radially extending bars,
said shafts being sufficiently proximate to permit the orbit of said bars to overlap so as to separate said masses of compact material passing through said bars, and
said plurality of rotating brush elements being provided on adjacent counterrotating shafts wherein said brush elements extend radially and confront brush elements on an adjacent shaft.

19. The apparatus according to claim 18 including,
said brush elements being in close proximity to brush elements on an adjacent shaft whereby to tear away particulate material from any small mass or nodule of material passing between adjacent brush elements.

20. The apparatus according to claim 14 further comprising,
an agitator means positioned within said hopper and above said shredding means and said conveying means being an auger.

21. The apparatus according to claim 20 including,
said agitator means comprising a rotating shaft having radially extending elongated elements.

22. The apparatus according to claim 14 further comprising,
a rotating means for rotating the shafts of said shredding means at varying speeds to vary the shredding of said masses.

23. The apparatus according to claim 1 including,
said vane means comprising at least seven vanes.

24. The apparatus according to claim 1 including,
said vane means comprising a plurality of vanes and an attaching means for attaching each said vane to said drum at spaced location on said drum, and
a truncated-cone shaped airlock being defined by said housing, a pair of adjacent vanes, and the portion of said drum between said adjacent vanes.

25. A feeder assembly for particulate matter blowing machines comprising,
a cylindrical member having an opening along its surface through which said particulate matter is inserted,
a drive shaft positioned longitudinally in said member,
a drum mounted around said drive shaft, said drum having a diameter greater than said drive shaft and less than said cylindrical member,
a vane means attached to said drum and engaging the inner surface of said member at a plurality of locations whereby a plurality of airlocks are defined,
an inlet cover attached to an end of said member,
said inlet cover having an inlet opening through which gases are forced into said airlocks, and
an outlet cover attached to the end of said cylindrical member opposite said one end,
said outlet cover having an outlet opening through which said particulate matter is blown out of said airlocks,
said outlet opening being progressively larger at the trailing edge in the direction of rotation of said shaft and tapered to close at the leading edge.

26. The assembly according to claim 25 including,
said inlet opening being offset in the direction of rotation of said drive shaft from a vertical line passing through the center of said drive shaft, and
said outlet opening being generally aligned with said inlet opening.

27. The assembly according to claim 26 including,
said inlet opening being offset in the direction of rotation of said drive shaft from a vertical line passing through the center of said drive shaft,
said outlet opening being generally aligned with said inlet opening,
said inlet opening and said outlet opening being disposed at an angle to the horizontal, and
said inlet opening and said outlet opening being longer than the distance between two adjacent said first legs at the location next to said openings.

28. The assembly according to claim 25 including,
said vane means comprising a plurality of elongated brackets, each said bracket having a first leg positioned along said drum, a sealing strip secured to said first leg, a securing means for securing said strip to said first leg, a second leg attached to said first leg and extending generally radially from said drum, and an attaching means for attaching said first leg to said drum.

29. The assembly according to claim 28 including, said securing means comprising an adhesive means.

30. The assembly according to claim 28 including, said attaching means comprising a removable attaching means.

31. The assembly according to claim 28 including, said strips defining a seal with said member.

32. The assembly according to claim 28 including, said vane means comprising at least seven vanes.

33. The apparatus according to claim 25 further comprising,
a rotating means for rotating said drive shaft.

34. The assembly according to claim 25 including,
said vane means comprising a plurality of vanes and an attaching means for attaching each said vane to said drum in spaced relation whereby each said airlock has a truncated-cone shape.

* * * * *